Feb. 24, 1931. H. C. JONES 1,793,698
CAMERA
Filed Oct. 8, 1927 5 Sheets-Sheet 1

INVENTOR
Harry C. Jones
BY
Williams & Morse
ATTORNEYS

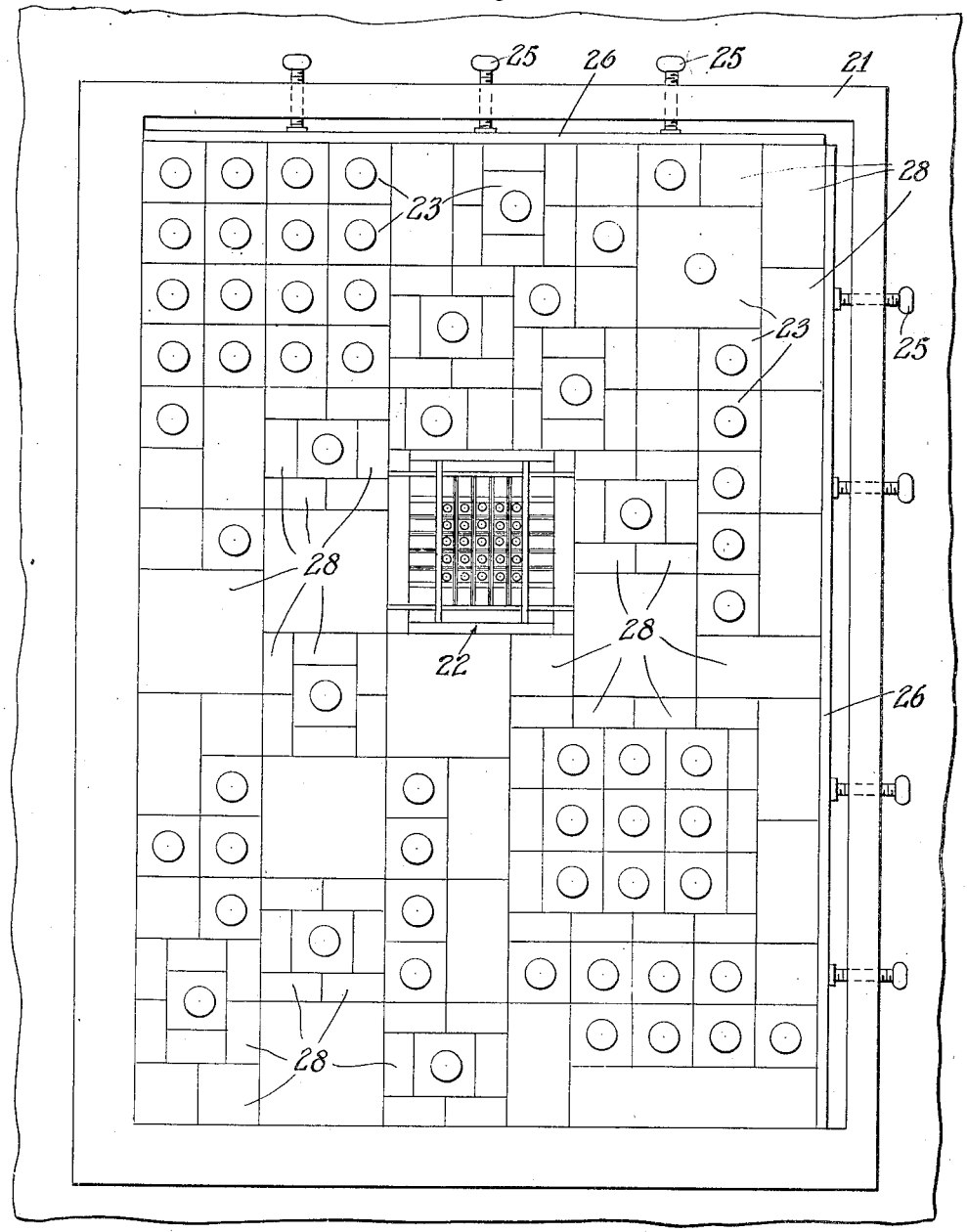

Feb. 24, 1931.  H. C. JONES  1,793,698
CAMERA
Filed Oct. 8, 1927   5 Sheets-Sheet 3
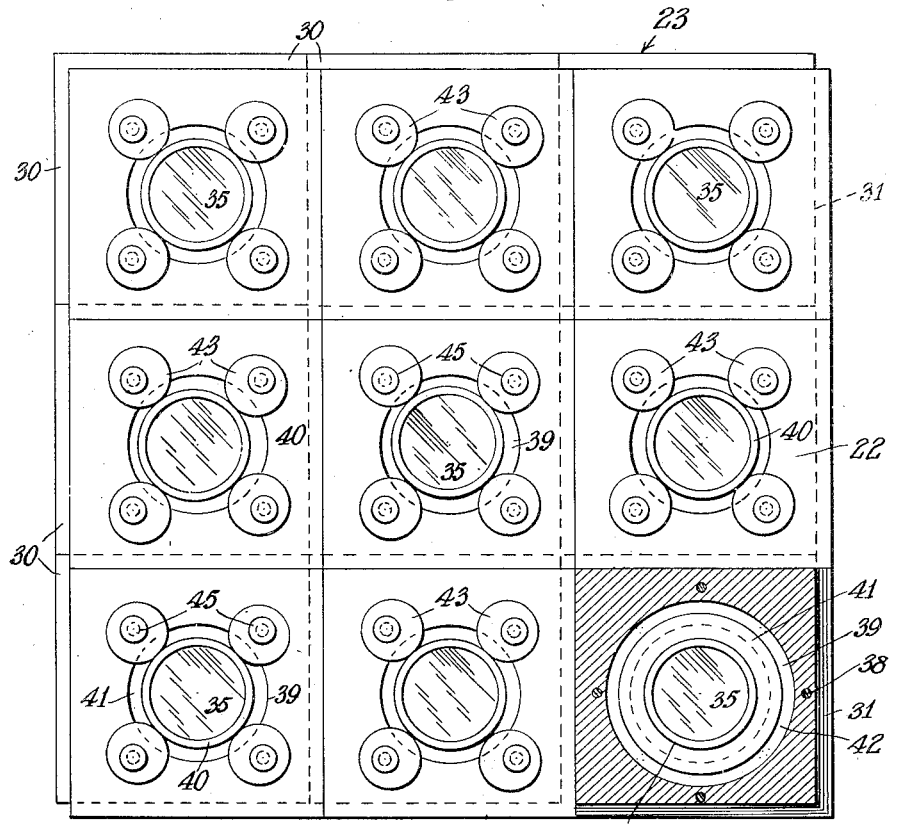
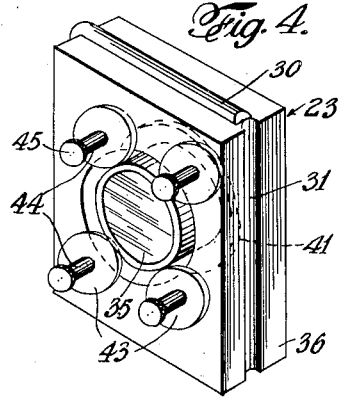
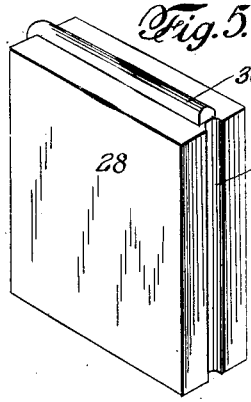
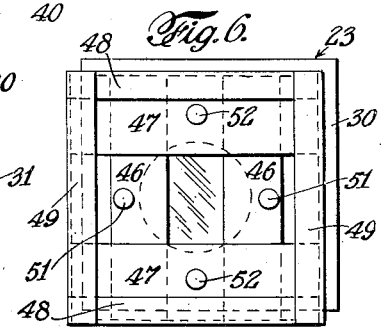
INVENTOR
Harry C. Jones
BY
Williams & Morse
ATTORNEYS Feb. 24, 1931.  H. C. JONES  1,793,698
CAMERA
Filed Oct. 8, 1927  5 Sheets-Sheet 4

INVENTOR
Harry C. Jones
BY
Williams & Morse
ATTORNEYS

Feb. 24, 1931.  H. C. JONES  1,793,698
CAMERA
Filed Oct. 8, 1927  5 Sheets-Sheet 5

INVENTOR
Harry C. Jones
BY
Williams & Morse
ATTORNEYS

Patented Feb. 24, 1931

1,793,698

UNITED STATES PATENT OFFICE

HARRY C. JONES, OF NEW YORK, N. Y.

CAMERA

Application filed October 8, 1927. Serial No. 224,946.

This invention relates to cameras and is particularly adapted to be used in making or conditioning press plates for use in photolithographic printing.

The general object of the invention is to provide a new and improved camera for making a plurality of exposures from a single subject or for making a plurality of exposures from different subjects, each appearing as many times as may be desired, upon a sensitive surface such as a sensitized press plate, a sensitized film or any other surface upon which an image can be produced by the action of light passing from a subject to such surface.

Another object of the invention is to provide means by which exposures may be easily and accurately located in predetermined positions upon the sensitive surface and in various spaced relations to each other.

A further object of the invention is to provide means for the economical and expeditious production of a series of color plates on which the individual pictures, representing a portion or portions of the subject, will be so located that the printed parts will accurately register as the plates are used one after another in the printing of the complete picture.

Another object of the invention is to provide a new and improved camera of the character mentioned which is simple in construction, easy to operate and reliable in use.

Other objects and advantages of the invention will become apparent from the following description when taken in connection with the accompanying drawings, in which:

Figure 2 is a front elevation of a lens frame carrying a plurality of lenses, some of which are adapted for simultaneous adjustment and others of which are adapted for individual adjustment.

Figure 3 is a detailed view of a plurality of lens units arranged in a group and carrying respectively individually adjustable lenses, one of such units being shown in section and the remainder in front elevation.

Figure 4 is a perspective view of one of the lens units shown in Figure 3.

Figure 5 is a perspective view of a spacing block.

Figure 6 is a rear view of a lens unit provided with adjustable shields or wings for confining the range of the lens to a desired area.

Although this invention may be embodied in various forms of cameras, it is herein illustrated in connection with a camera of the so-called "dark room type."

Figure 1:
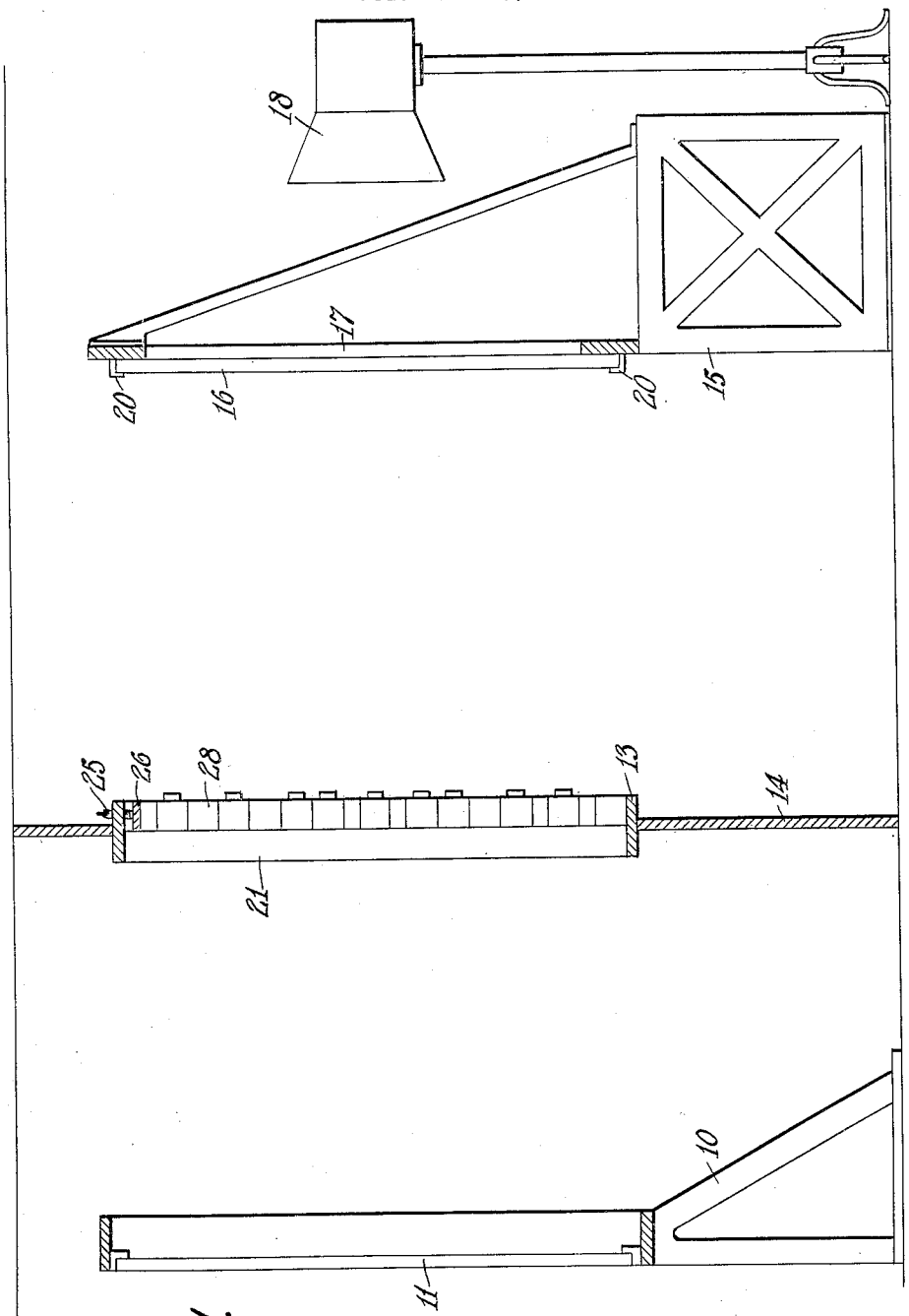
Figure 1 is a view partly in elevation and partly in section of a camera embodying this invention.

Referring to Figure 1, wherein a camera of the dark room type is more or less diagrammatically illustrated, the numeral 10 indicates a holder for a sensitive surface 11, such as a sensitized film or a sensitized plate. As is customary, the sensitive surface 11 may occupy the same position as the usual removable ground glass or porcelain plate upon which the image is focussed preparatory to making the exposure or exposures.

In front of the holder 10 is located a lens holder 13, which may be arranged and suitably supported within an opening formed in one of the walls 14 of the dark room. A subject holder 15 is located in front of the lens holder 13 and is adapted for the reception of a removable copy board 16, upon which one or more subjects to be photographed may be located. This copy board is shown as adapted to overlie an opening 17, formed in the holder 15, through which opening light may be projected from a source, such as an arc lamp 18 located at the rear of the subject holder, when exposures are to be made from any transparency, such as a negative film, upon which appear the subject or subjects to be photographed. It will be understood that when the subject or subjects are photographed from a transparency, such transparency is substituted for the copy board 16 and held in position on the holder 15 by brackets 20 which are also employed to support the copy board.

Figure 7:
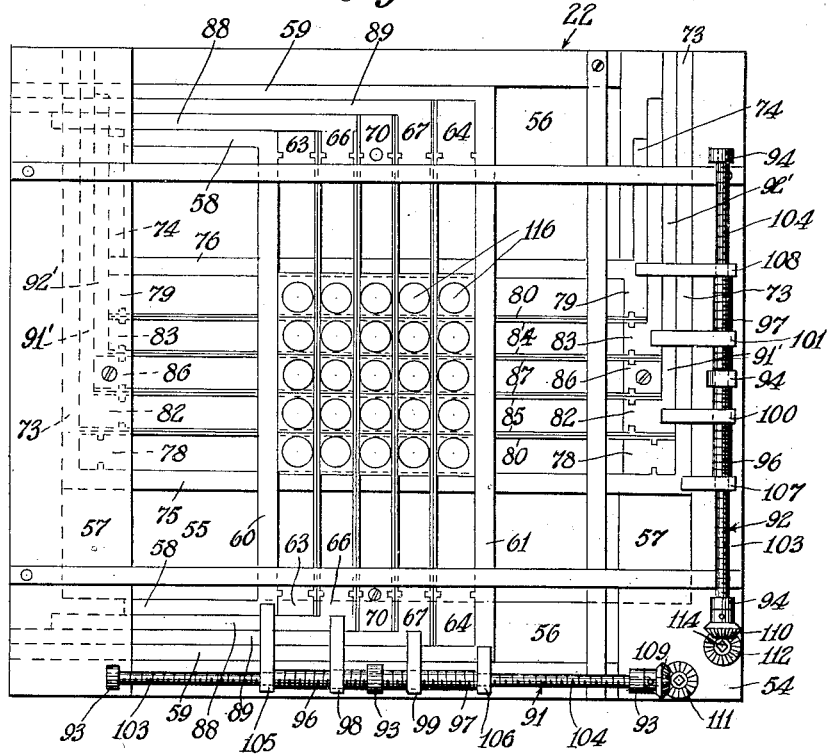
Figure 7 is a detailed view of a lens unit in which the lenses thereof are simultaneously adjustable.
Figure 8:
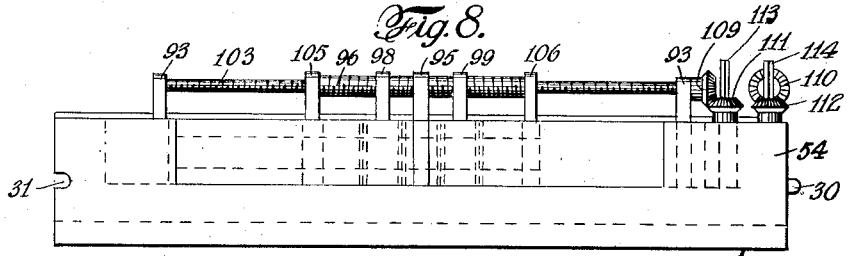
Figure 8 is an end view of the unit as viewed from below in Figure 7.

Referring to Figure 2, the lens holder 13 is shown as including a frame 21, within which lens units 22, of the type shown most clearly in Figures 7 and 8, and lens units 23, of the type shown most clearly in Figures 3, 4, 6 and 13, are adapted to be arranged and locked in preselected relations. The locking means for the lens units 22 and 23 may include a plurality of thumb screws 25, herein shown as carried by adjacent side members of the frame 21. The inner ends of these thumb screws 25 are adapted to engage pressure strips 26, through which pressure may be applied to the lens assembly in at least two directions, whereby the lens units are locked in their assembled relation.

According to this invention, the lens units may be arranged in any desired preselected relation to each other by the use of a plurality of spacing blocks 28 of different dimensions, the width of which may vary according to various requirements, although such spacing blocks are herein illustrated as of only six sizes. In setting up the assembly, the lens units are arranged within the frame 21 in substantially the relation that the exposures are to be made with reference to one another on the sensitive surface, means being provided, as will hereinafter appear, to accurately locate the exposures on the sensitive surface with reference to one another.

The spacing blocks 28 are arranged intermediate the lens units, or in such other relation thereto as is required, to maintain the proper relation between the lens units, and, like the lens units, are locked in position within the frame 21 by the screws 25 and pressure plates 26. In order to ensure proper alignment of the lens units with respect to each other and with respect to the spacing blocks 28, such units and blocks are each provided on two of their sides with tongues 30 and on two of their sides with grooves 31, the tongues 30 being adapted to enter the grooves 31, as will be apparent, and thus not only ensure proper alignment of the lens units and spacing blocks but also lend rigidity to the assembly as a whole.

Inasmuch as removability of the lens units is provided for, it follows that after the desired number of exposures have been made in connection with a given arrangement of lens units, the assembly may be taken down and a new assembly set up in which a different spacing or arrangement of lens units is to be employed. The arrangement of lens units herein shown is an arbitrary one and is in no way intended to represent an assembly adapted for use in connection with any particular layout or to meet any particular requirement.

The lens units 23, shown most clearly in Figures 2, 3, 4, 6 and 13, are provided with independently laterally adjustable lenses 35, and include lens blocks 36, made up of two sections 37, which are held together by suitable means, such as screws 38. The sections 37 are provided with centrally located openings 39 which register with each other and are sufficiently large to permit substantial radial adjustment of the lens barrels 40, arranged respectively within the openings 39 and having the respective lenses 35 rigidly mounted therein. The lens barrels 40 are held against tipping or undue displacement by peripheral flanges 41, the margins of which are confined for lateral movement within annular passages 42 provided intermediate the sections 37, such passages being formed by relieving the adjoining faces of the sections 37 adjacent the openings 39, as shown most clearly in Figure 13.

For laterally adjusting the lens barrels 40 in order to effect corresponding adjustment of the lenses 35 carried thereby, a plurality of manually operated eccentric discs 43 are provided. These eccentric discs 43 are secured to rotatable shafts 44, suitably journaled in one section 37 of the respective lens blocks 36, and are provided externally with knurled knobs 45 which, when the lens assembly is mounted in the holder 13 project towards the holder 10 and thus enable the operator to readily rotate the shafts 44 with a view to obtaining the proper adjustment of the lenses 35 for the purpose hereinafter more particularly described.

In order to confine the exposure to be made through each of the lenses 35 to the desired area on the sensitive surface, each of the lens units 23 is provided on its face nearest the subject to be photographed with a plurality of adjustable shields 46 and 47. These shields may be flat strips of metal arranged at right angles, as shown, the shields 46 being slidably mounted beneath guide strips 48 secured to the respective lens blocks 36, and the shields 47 being slidably mounted upon the shields 46 and beneath guide strips 49, which are also secured to the respective lens blocks. By this arrangement of shields 46 and 47, the effective range of the lenses 35 may be varied in order to meet varying requirements. Once the proper adjustment of the shields 46 and 47 is determined for a given subject, such shields may be locked in their proper positions by set screws 51 and 52 carried respectively by the shields 46 and 47 and adapted to be run down into impinging engagement with the face of the lens units 36. The projecting ends of the set screws 51 and 52 also serve as handles, or the like, by which the operator is enabled to readily adjust the shields to their proper respective positions.

Referring to Figures 2 and 7 to 12 inclusive, the lens unit 22 is of such design as to enable a plurality of exposures to be made simultaneously from a single subject, the number of exposures being equal to the number of lenses employed, which in the present instance, is twenty-five, although a greater or fewer number of lenses may be employed if desired.

Figure 9:
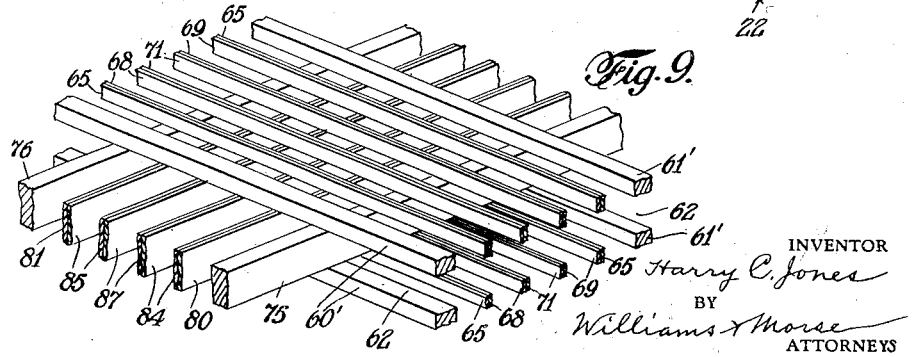
Figure 9 is a perspective view of a plurality of lens actuating bars arranged in a meshed relation for moving the simultaneously adjustable lenses in one direction or the other.

The lens unit 22 includes a frame 54, see Figures 7 and 8, the side members of which are relieved adjacent the central opening 55 thereof, thus forming ledges 56 and 57. Upon the ledges 56 is slidably supported the legs 58 and 59 of a pair of oppositely movable yokes 60 and 61 which are cut away intermediate their ends, thus forming lens actuating bars 60' and 61' between which other lens actuating bars pass at right angles thereto, as best seen in Figure 9. To the outer ends of the bars 60 and 61 are connected blocks 63 and 64, respectively, to each of which blocks a pair of actuating bars 65 are connected. Adjacent the blocks 63 and 64 are blocks 66 and 67 respectively. To the blocks 66, lens actuating bars 68 are connected, and to the blocks 67 lens actuating bars 69 are connected. Intermediate the blocks 66 and 67 are rigidly fixed blocks 70. These blocks 70 are secured to the ledges 56 by any suitable means, such as screws, and are connected to lens block retaining bars 71.

Slidably supported upon the ledges 57 are the legs 73 and 74 of a pair of yoke-like lens actuating bars 75 and 76, which are arranged at right angles to the aforementioned bars 60, 61, 65, 68, 69, and 71. To the opposite end of the bars 75 and 76 are secured blocks 78 and 79, to which are secured lens actuating bars 80 and 81 respectively. Adjacent the blocks 78 and 79 are blocks 82 and 83 to which pairs of actuating bars 84 and 85 are respectively connected. Intermediate the blocks 82 and 83 are blocks 86. These blocks 86 are secured to the ledges 57 by any suitable means, such as screws, and are secured to lens block retaining bars 87.

To the blocks 66 and 67 are secured, respectively, guiding bars 88 and 89. These guiding bars 88 and 89 serve to guide the blocks 66 and 67 in their movement toward and away from each other, and the legs 58 and 59, which the guiding bars 88 and 89 respectively engage, serve to steady the blocks 63 and 64 in their movements toward and away from each other. Similarly, the blocks 82 and 83 are connected to guiding bars 91' and 92' which slidably engage each other and also the respectively adjacent legs 73 and 74 of the yokes 75 and 76, the guiding bars 91' and 92' and the legs 73 and 74 serving to steady the movements of the blocks 78, 79, 82 and 83 toward and away from each other.

For effecting relative movement between the groups of blocks 63, 64, 66, 67 and 70, and 78, 79, 82, 83 and 86, a pair of differential screws 91 and 92 are provided. These screws are suitably mounted in bearings 93 and 94, respectively, and are provided with screw threaded portions 96 and 97, the screw threads of these portions being of the same pitch but respectively reversed. On the screw threaded portions 96 and 97 of the screw 91 are carried actuating fingers 98 and 99, which are connected, respectively, to the blocks 66 and 67, and on the screw threaded portions 96 and 97 of the screw threaded shaft 92 are carried actuating fingers 100 and 101 which are connected, respectively, to the blocks 82 and 83. The screws 91 and 92 are also provided with screw threaded end portions 103 and 104, the threads of which are reversed with respect to each other and have a pitch twice that of the threads of the screw threaded portions 96 and 97. On the screw threaded portions 103 and 104 of the screw 91 are carried actuating arms 105 and 106 which are secured to the yokes 60 and 61, respectively, and on the screw threaded portions 103 and 104 of the screw 92 are mounted actuating arms 107 and 108 which are connected, respectively, to the yokes 75 and 76.

The screws 91 and 92 carry bevelled gears 109 and 110, respectively, which mesh with similar gears 111 and 112 mounted on shafts 113 and 114 suitably journaled to the frame 54. The outer ends of the shafts 113 and 114 are suited to receive a wrench by which rotation of the screws 91 and 92 may be effected for the purpose of producing relative lateral adjustment between the plurality of lenses 116 included in the lens unit 22.

Figure 10:
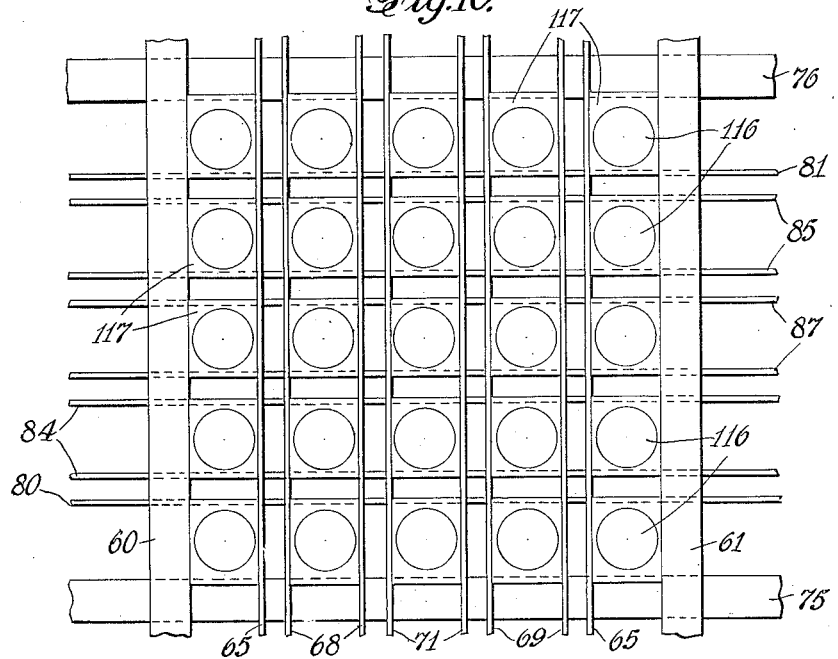
Figure 10 is a fragmental enlarged plan view showing the lens blocks and lens actuating bars of Figure 7 in a more widely separated relation.
Figure 11:
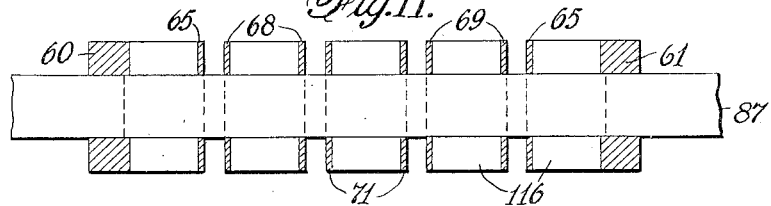
Figure 11 is a view partly in section and partly in elevation showing the relation of the lens actuating bars to each other and to the lens blocks as viewed from below in Figure 10.
Figure 13:
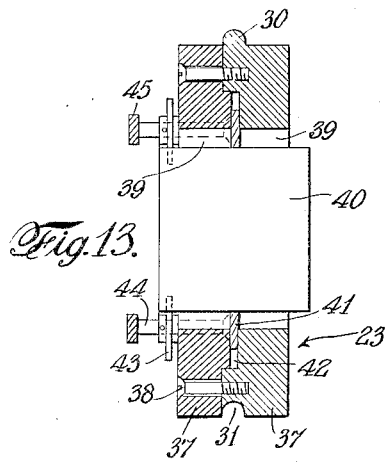
Figure 13 is a central, vertical sectional view of a lens unit having an individually adjustable lens, the lens barrel of such unit being shown in elevation.
Figure 12:
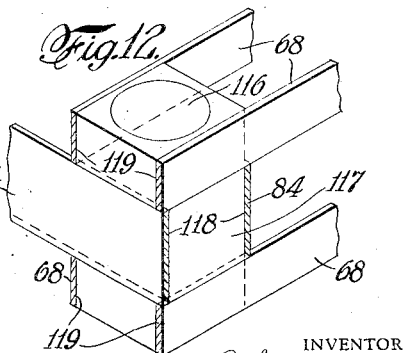
Figure 12 is a perspective view showing further the relation of the lens actuating bars to each other and the manner in which the lens blocks are supported thereby.

The lenses 116 are mounted in suitable lens blocks 117 having opposite sides relieved, thus forming recesses 118, as shown in Figure 12, into which the intermediate actuating bars, as viewed in Figure 9, are adapted to fit, the recesses 118 in Figure 12 being arbitrarily shown as carrying the actuating bars 84, shown most clearly in Figures 9 and 10. The remaining side faces of the lens blocks 117 are cut away at opposite ends of the block, thus providing recesses 119, into which the upper and lower actuating bars, as viewed in Figure 9, are adapted to fit, such recesses in Figure 12 being arbitrarily shown as carrying the actuating bars 68, shown most clearly in Figures 9 and 10. By this interlocking arrangement of lens blocks and lens actuating bars, the lens blocks 117 are held against longitudinal displacement by the actuating bars which engage the same, but they are free to move with respect to the intermediate bars as viewed in Figure 9, when the screw 91 is rotated, and are free to move with respect to the upper and lower actuating bars as viewed in Figure 9, when the screw 92 is actuated. This holds true for all of the lens blocks 117 except the central one, it being always maintained in a fixed position by the bars 71 and 87, between which it is confined, regardless of whether or not the screws 91 and 92 are actuated. Due to the relation of the threads of the several screw threaded portions 96, 97 and 103 and 104 of the screws 91 and 92, uniform spacing of the rows of lenses, whether such rows be considered from one side to the other or from top to bottom, as viewed in Figures 2, 7 and 10, may be accomplished; that is to say, the vertical rows of lenses as viewed in Figures 2, 7 and 10 may be spaced uniformly from each other by rotating the screw 91 without disturbing the vertical relation of the lenses, or the horizontal rows of lenses, as viewed in Figures 2, 7 and 10, may be uniformly spaced from each other by rotating the screw 92 without disturbing the horizontal relation of the lenses. On the other hand, uniform spacing of the lenses from each other both vertically and horizontally, as illustrated in Figures 10 and 11, may be effected by rotating both of the screws 91 and 92 either individually or simultaneously. Should it be desired to adjust the vertical rows of lenses, as viewed in Figures 2, 7 and 10, further apart than the horizontal rows of lenses, as viewed in those figures, the desired adjustment may be effected by rotating the screw 91 to a greater extent than the screw 92, or conversely, if greater adjustment is desired between the horizontal rows of lenses, as viewed in Figures 2, 7 and 10, than is desired between the vertical rows of lenses, as viewed in those figures, such adjustment may be effected by rotating the screw 92 to a greater extent than the screw 91. Thus it will be appreciated that the adjusting means, herein shown, for the lenses 116 is such that uniform relative movement in either direction may be effected between the vertical rows of lenses 116; that uniform relative movement in either direction between the horizontal rows of lenses 116 may be effected; and that the spacing of the vertical rows of lenses may be varied with respect to the spacing of the horizontal rows of lenses to suit varying conditions, depending upon the spacing desired between the exposures to be made through the lenses 116.

While the lenses 116 are herein shown as being substantially smaller in diameter than the lenses 35, it is to be understood that in the arrangement shown the smaller lenses are to have the same focal length as the larger lenses, and all of the lenses are to be arranged in the same vertical plane which is parallel to the sensitive surface and the subject or subjects to be photographed. Furthermore, it is to be understood that the shields 46 and 47, or their equivalents, are to be employed in connection with the lenses 116, but such shields for the lenses 116 are omitted from the drawings for the purpose of clearness. The shields to be employed in connection with the lenses 116 may be mounted upon the lens blocks 117 by the same means, or the equivalent thereof, as shown in Figure 6 for mounting the shields 46 and 47 upon the lens blocks 36. Such shields, when used in connection with the lens 116, are adapted to confine the rays of light passing from a subject through the respective lenses, to given areas on the sensitive surface, and their respective positions may, like the shields 46 and 47 shown in connection with the lens blocks 36, be determined by the shape of the subjects being photographed, as will be readily understood.

When using the device in making exposures, as for example, upon the sensitized surface of a press plate to be used in photolithographic printing, a layout is made upon a suitable surface, such for example as a porcelain plate, the layout being made in accordance with the relation in which the exposures are to be made upon the sensitized surface from the subject or subjects to be photographed. After the proper layout has been made, the ground glass or porcelain plate is placed in the plate holder 10 and the subjects to be photographed are placed upon the copy board 16, each subject being there arranged in a position corresponding to the center or substantially the center of the area or space allotted to it in said layout. The lens assembly is then made up, and may include any desired number of lens units of the type indicated by the numeral 22, or any desired number of units of the type indicated by the numeral 23, or any combination of these two forms of units. In making up the assembly, the units are so placed in the frame 21, that they bear the same or substantially the same grouped relation to each other as the subjects to be photographed. After placing the lens units in their proper positions, they are locked therein by the locking means including the thumb screws 25 and pressure strips 26, the proper space between the lens units being maintained by the spacing blocks 28 which are also locked in the frame 21 by said locking means. After locking the lens units and spacing blocks within the frame 21, the assembly, which is herein shown as made up of one of the lens units 22, and a plurality of the lens units 23, is then placed in the lens support 14, whereupon light rays from the subject to be photographed are permitted to pass through the lenses of such units, with the result that images of the subjects to be photographed are produced on the ground glass or porcelain plate carried by the holder 10. The lenses of the lens units may now be so adjusted laterally as to bring the images on the ground glass or porcelain plate into proper positions with reference to the areas which have been allotted in the layout to the respective subjects to be photographed. After such lateral adjustment of the lenses has been made the shields 46 and 47 of the lenses may be adjusted according to the shape of the subjects to be photographed, whereupon they are locked in their proper positions by the set screws 51 and 52 respectively. These shields serve to confine the light rays, passing through the respective lenses, to the desired areas on the sensitized surface, as will be readily appreciated. Referring to the lens units 22, the lenses 116 thereof are adjusted relatively to each other in one direction or the other by the differential screws 91 and 92 until the proper spacing of the images with respect to each other has been made within the area allotted to the plurality of exposures to be made from a single subject. As to the lens units 23, the lenses 35 thereof are laterally adjusted by the eccentric discs 43 until the images of the subjects to be photographed are properly located within the areas allotted to the respective subjects. After making the necessary lateral adjustments of the lenses, the ground glass or porcelain plate, upon which the layout has been made and upon which the images of the subjects to be photographed have been projected, is removed from the holder 10, and a sensitive surface, such as a sensitized plate for use in photo-lithographing printing, is placed in the support 10, in the position previously occupied by the ground glass or porcelain plate. After placing the sensitive surface in position, the shutters, not shown, of the lenses are opened, preferably simultaneously, by any suitable means, thus exposing the areas of the sensitized surface to the light rays passing from the respective subjects through the lenses, with the result that the exposures are made upon the sensitized surface in the same spaced relation that previously existed between the images upon the ground glass or porcelain plate. Once the proper adjustment has been made, no further attention is required by the operator in that particular when exposing one sensitized surface after another, as is often desirable when conditioning a plurality of press plates, for use in photo-lithographic printing, on which the same spacing of exposures is to be maintained for all of the plates.

When making exposures from transparencies, such as negatives, upon which the subject or subjects to be photographed appear, such negatives are placed in the brackets or supports 20 in lieu of the copy board 16. Light rays, with the aid, if necessary, of a suitable source of light, such as an arc lamp 18 located at the rear of the holder 15, are then projected through the transparency and the subject or subjects carried thereby are photographed as above explained.

In addition to conditioning press plates for use in photo-lithographic printing, as above described, and in addition to the many phases of commercial photography to which the invention is particularly adapted, the apparatus herein shown is especially adapted for producing a series (two or more) of color plates on which the individual pictures, representing a portion or portions of the subject to be reproduced, will be so located that the printed parts will accurately register as the plates are used one after the other, for example, in a photo-lithographic printing machine. To this end the colored portions of the pictures to be produced are made preferably upon transparent or translucent sheets. The sheets are then arranged in a superimposed relation with an opaque sheet intermediate adjacent sheets when such adjacent sheets are transparent or translucent, the relation of the colored portions being such that they maintain a proper registration with each other. The stack of superimposed sheets is then fixed upon the copy board 16 in the proper relation or substantially the proper relation to the lens or lenses through which the exposures are to be made. With a ground glass or porcelain plate in the holder 10, the necessary adjustment of the lens shields may be made together with such lateral adjustments of the lenses as are necessary to bring the images of the first picture or pictures to be photographed into proper position upon the layout. After the proper lateral adjustments of the lenses have been made, the ground glass or porcelain plate is removed and the sensitive surface, such as the press plate to be conditioned for use in photo-lithographic printing, is exposed from the picture or subject carried by the uppermost sheet of said stack. After such exposure has been made, the uppermost sheet, together with the adjacent opaque sheet, if such opaque sheet is employed, is removed from the stack, and the previously exposed plate is removed from the holder 10, whereupon the next plate to be exposed is introduced into such holder. This unexposed plate is then exposed from the picture carried by the uppermost sheet of the stack without necessitating further adjustment of the lenses. Succeeding plates are exposed from the succeeding pictures until all of the exposures have been made, one adjustment of the lenses being sufficient for the entire series. Inasmuch as each succeeding plate to be exposed assumes the same position in the holder 10 as the preceding plate, and inasmuch as the series of pictures are properly positioned one upon the other, before the first exposure is made, it follows that the individual pictures, representing a portion or portions of the subject to be reproduced will be so located on the plates that the printed parts will accurately register when the plates are properly positioned in the printing press one after another and there used in the printing of the complete picture.

Certain embodiments of the invention have been shown and described, but the invention may be otherwise embodied without departing from its spirit or the scope of the following claims.

I claim:

1. A camera having holding means for a sensitive surface and holding means for subjects to be photographed, a group of lenses for making a plurality of exposures from a single subject, a plurality of lenses for making a plurality of exposures from a plurality of subjects, all of said lenses having their axes disposed in parallel, and means for adjustably masking any indvidual lens from others in the same group.

2. A camera having holding means for a sensitive surface and holding means for subjects to be photographed, a group of lenses for making a plurality of exposures from a single subject and a plurality of lenses for making a plurality of exposures from a plurality of subjects, means for masking any individual lens and adjusting means for effecting relative lateral adjustment of certain of said lenses with respect to the remaining of said lenses.

3. A camera having holding means for a sensitive surface and holding means for subjects to be photographed, a group of lenses for making a plurality of exposures from a single subject and a plurality of lenses for making a plurality of exposures from a plurality of subjects, adjusting means for laterally adjusting each of said lenses, whereby rays of light passing through said lenses may be shifted to strike said sensitive surface at preselected places and adjustable means for partially intercepting light rays from any lens in said group.

4. In a camera, a lens holding frame having a plurality of lens units, lenses for said units, and a plurality of spacing blocks of different dimensions placed within said frame to space said lens units in various positions from each other.

5. In a camera, a lens holding frame having a plurality of lens units, lenses for said units, a plurality of spacing blocks of different dimensions in the frame to space said lens units in various positions from each other, and adjusting means for effecting relative lateral movement between said lenses.

6. In a camera, a lens holding frame having a plurality of lens units, lenses for said units, a plurality of spacing blocks of different dimensions arranged interchangeably within said frame to space said lens units in various positions from each other, interengaging means on the edge of said blocks and adjusting means included in said units for laterally moving said lenses relative to each other.

7. In a camera, the combination with a sensitive surface having a holder and a lens holding frame, of a plurality of lens units, lenses for said units, and a plurality of spacing blocks of different dimensions in said frame to space said lens units in various positions from each other, and adjusting means for effecting relative lateral adjustment of said lenses whereby the rays of light passing through said lenses may be shifted to strike said sensitive surface at given portions thereof.

In testimony whereof, I have affixed my signature to this specification.

HARRY C. JONES.